COORDINATION CONTROLS FOR REMOTE CONTROL SYSTEMS

Filed Dec. 5, 1958 3 Sheets-Sheet 1

July 30, 1963 A. P. JACKEL 3,099,815

COORDINATION CONTROLS FOR REMOTE CONTROL SYSTEMS

Filed Dec. 5, 1958 3 Sheets-Sheet 2

INVENTOR.
Arthur P. Jackel.
BY
W. L. Stout.
HIS ATTORNEY

United States Patent Office
3,099,815
Patented July 30, 1963

3,099,815

COORDINATION CONTROLS FOR REMOTE CONTROL SYSTEMS

Arthur P. Jackel, Penn Hills Township, Allegheny County, Pa., assignor to Westinghouse Air Brake Company, Wilmerding, Pa., a corporation of Pennsylvania
Filed Dec. 5, 1958, Ser. No. 778,490
10 Claims. (Cl. 340—163)

My invention relates to coordination controls for remote control systems. More particularly, my invention relates to coordinating and synchronizing circuit arrangements which provide for operation of coded remote control systems over half-duplex communication channels which have considerable but variable transmission delay time.

As remote control systems are applied to different types of operation, additional and varied difficulties are experienced in adapting standard systems to the pecular requirements of each installation. In such installations, it is increasingly common that the operating organization does not provide self-owned communication facilities. This is particularly true where extensive distances between the master control locations and the remotely operated stations are involved. Under such conditions, the necessary communication channels are provided through the use of leased circuits obtained from public communication facilities. The characteristics of such leased facilities are frequently beyond the control of the system operator. This results from the necessity for shifting the actual routing and type of channel furnished by the leasor in order to overcome fault conditions and to efficiently use the network of public communication facilities. Thus, the characteristics of the line circuits available for the remote control system may vary from day to day. Particular difficulty is experienced with extensive and variable pulse transmission delay times, especially where carrier circuits are provided for the remote control system communication channel.

When a coded remote control system is used in connection with a single direction communication channels, that is, one channel for each direction with duplex operation of the control system, the pulse delay time is of little consequence to the system operation. Codes transmitted from one location are received at the end of the delay times at other locations as if there were no delay. However, in the more common half-duplex operation of such remote control systems, difficulties arise in system operation where simultaneous code starts may occur, one from the control office and another from one of the remote stations. The basic design of such systems is such that the control code will eventually override the indication code being transmitted. However, by the time that the indication code is locked out and the station prepared to receive the control code, the station coding equipment may be several steps advanced in its cycle of operation so that the first control pulse may be received as the next pulse in the counting sequence. Operation of the station equipment then continues from that point and various control functions may be lost or at least incorrectly recorded. Thus, some arrangement is needed to synchronize the system operation prior to the transmission of any control code. Further, the system must be able to lock out or interrupt an indication code if a fault condition occurs or the code pattern is altered due to line interference during code transmission from the station which requires that the indications be rejected by the office. Additional advantages may also be obtained in system operation if single direction transmission is possible in the event that a continued circuit fault condition interrupts code transmission in one direction only.

Accordingly, it is an object of my invention to provide a remote control system with synchronizing circuit arrangements to assure correct coordination between control and indication codes.

Another object of my invention is to provide a remote control system which operates over a half-duplex type communication channel with synchronizing arrangements to coordinate system operation when control and indication codes are simultaneously initiated.

It is also an object of my invention to provide a synchronizing circuit arrangement for remote control systems operating in the half-duplex manner which eliminates the effects of pulse transmission delays inherent to the communication channel.

Still another object of my invention is to provide a coordination control arrangement for remote control systems which assures that all remote stations are in the proper condition to receive a control code before such a code is transmitted from the office.

Another object of my invention is the provision of coordination arrangements which delay the transmission of control codes in a remote control system until synchronization of the system locations is assured.

A further object of my invention is the provision of a coordination arrangement in a remote control system which delays the transmission of control functions until any remote station simultaneously initiating an indication code has been reset to its inactive condition prepared to receive controls, thus preventing the loss of control functions during the transmission cycle.

Another object of my invention is to provide, in a remote control system, a means to utilize single direction transmission for partial operation if a circuit fault condition prevents the transmission of codes in the opposite direction only.

An additional object of my invention is to provide a complete remote control system which operates over a half-duplex type communication channel having considerable transmission pulse delay time which may vary periodically.

A further object of my invention is to provide a remote control system for a half-duplex operation over communication channels which require additional synchronization checks due to the pulse propagation delay times inherent in the channel.

Other objects, features, and advantages of my invention will become apparent as the following specification progresses.

I shall now describe in detail apparatus embodying one form of my invention as specifically shown in the accompanying drawings and shall then point out the novel features thereof in the appended claims.

Referring now to the drawings.

Figure 1:
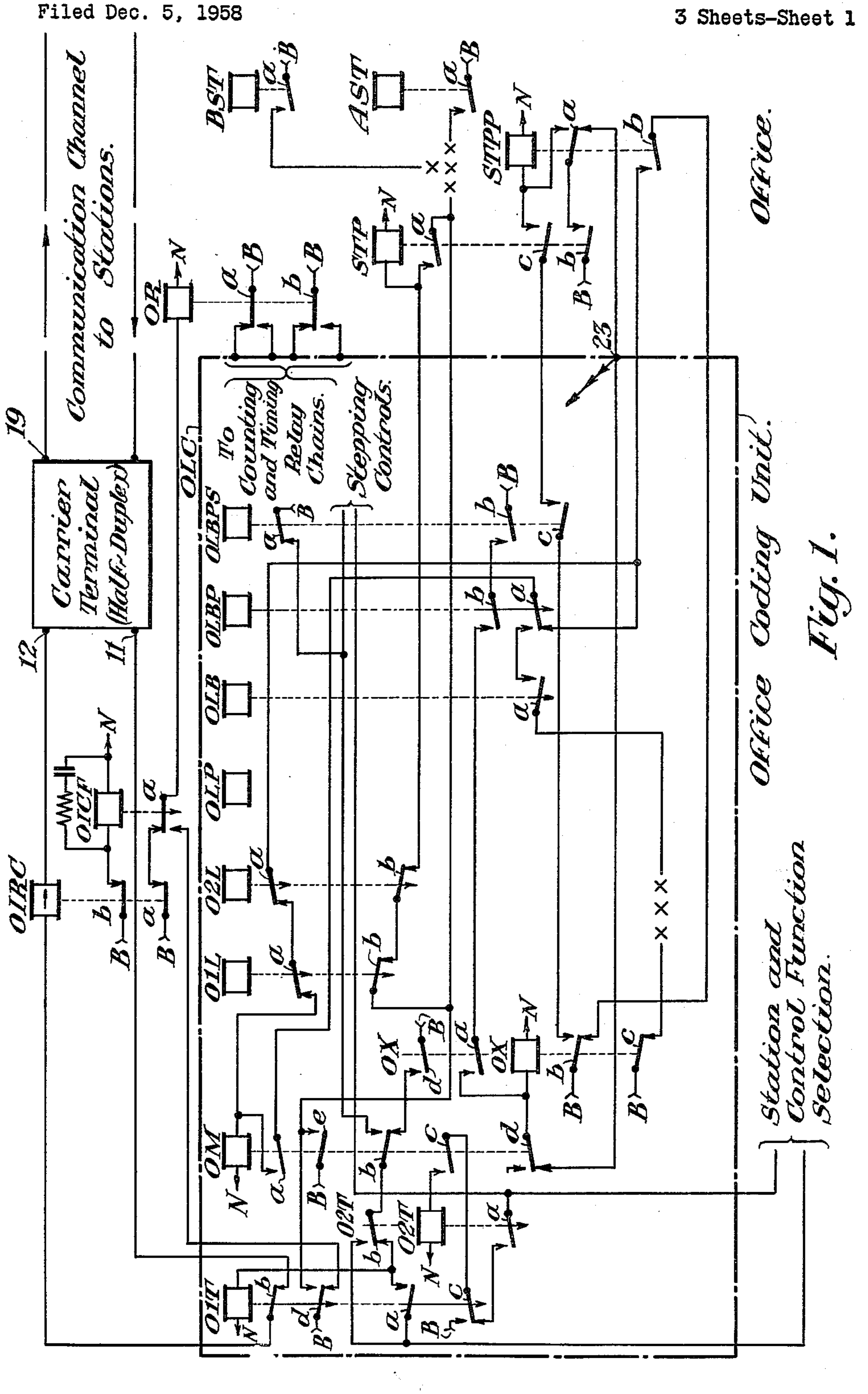
FIG. 1 shows diagrammatically a control office location of a multi-station remote control system which embodies one form of the coordinating and synchronizing circuit arrangement of my invention.

In each figure of the drawings, similar parts of the apparatus are denoted by similar reference characters. In addition, at each location, that is, at the office, the intermediate station, and the final station, a local direct current source of power is provided which may be a battery of proper size and capacity. However, the actual power source is not illustrated as the use of such is conventional and only the positive and negative terminals thereof are indicated by the conventional reference characters B and N, respectively. Certain relays used in the circuit arrangement at the various locations are of the biased type in which the relay is properly energized to close its front contacts only when the direction of current flow through the relay winding is in a preselected direction. Such relays are indicated by the conventional symbol, an arrow within the block representing the relay winding. It will be noted as the description progresses that the actual circuit connections in which these relays are used do not show the direction of current flow. However, the relays are so indicated in order that the quick release characteristics of such relays may be utilized in the system operation. Other relays are provided with slow release characteristics by which the relay, after the winding is deenergized, retains its front contacts closed for a preselected period of time. Such relays are conventionally indicated in the various figures of the drawings by downward pointing arrows drawn through the movable portion of each relay contact associated with the slow release relay. Other conventional symbols which are used in the circuits illustrated are believed to be sufficiently well known in the art to require no special explanation.

In practicing my invention, as particularly illustrated applied to a time code remote control system, I provide a delay in the transmission of control codes, after their initiation, during a synchronizing cycle of two pulses. The first of these two pulses is a line open pulse of extra length which locks out all of the remote station equipment, especially any stations which have initiated an indication code at the same time. The second of the two synchronizing pulses is a line closed step during which normal reset of the apparatus at all locations occurs. At the end of this period, the stored control codes are transmitted from the office, starting prior to the time that any station can begin the transmission of a stored indication code. This transmission delay period consisting of the two synchronizing steps is controlled by two added repeaters of the start relays at the office location. Upon the initiation of a control code, the first of the two repeater relays is energized providing that the office apparatus is in the inactive condition. This relay causes the transmission of the first synchronizing step, operating through the synchronizing relay usually provided in such systems although the control of this latter relay at this time is by an auxiliary circuit provided by my invention. The second repeater relay is then energized, after the initiation of the first synchronizing step, to prepare the code starting circuit to the master relay. The initial line open step is timed by the usual timing relay chain of the coding unit at the office. At the end of the timed period, the synchronizing relay is released and thus the initial line open step is terminated. During this period, all locations progress through a reverse dropout action into a lockout condition. The release of the synchronizing relay restores the line circuit to its normal condition which results in a normal reset action at all locations, again controlled by the timing chain of each coding unit. The master relay circuit at the office is held open during these periods until the office equipment is reset by the end of the second synchronizing step. At this time, the master relay is energized to initiate, in the usual manner, the transmission of the control code. The two repeater relays are held energized until the transmission of all desired control codes is completed.

At each intermediate remote station, a transmission direction reversing relay is provided which is responsive to the initiation of a control code or to the synchronizing pulses to override any indication code being received from any more distant station. Separate indication and control receiving circuits are also provided at these intermediate stations. However, relay contacts of control and indication receiving relays are interposed into the opposite circuit to provide for retransmission of a received code into the channel extending on from that location. I also provide fault detecting relays at all stations which control the circuit arrangements in a manner to permit single direction operation of the system, that is, controls or indications only through the intermediate locations, if fault conditions prevent code transmission in the opposite direction.

Figure 2:
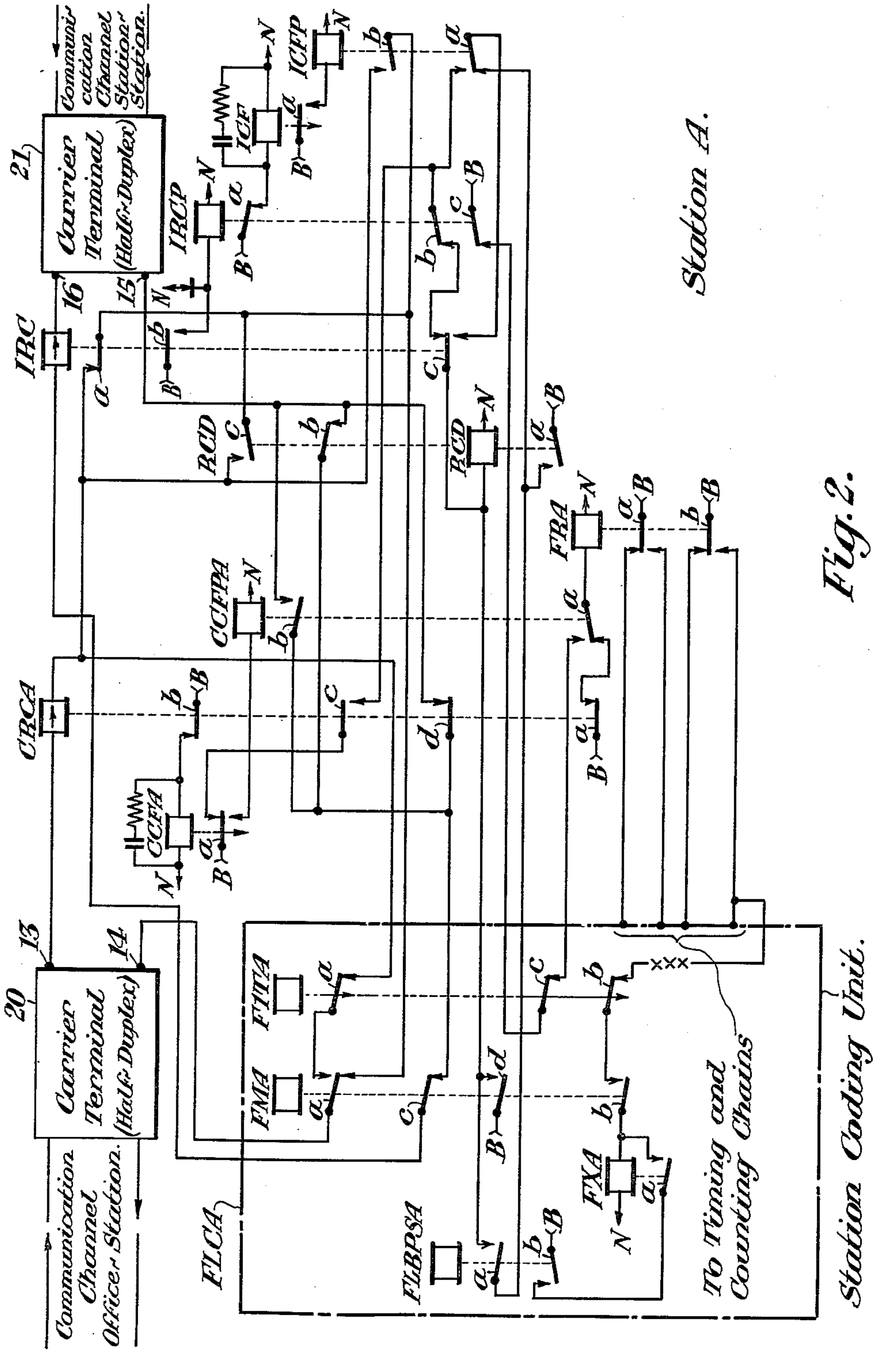
FIG. 2 shows in a similar manner an intermediate station location in the same remote control system, this station circuit arrangement also embodying the coordination circuits of my invention.
Figure 3:
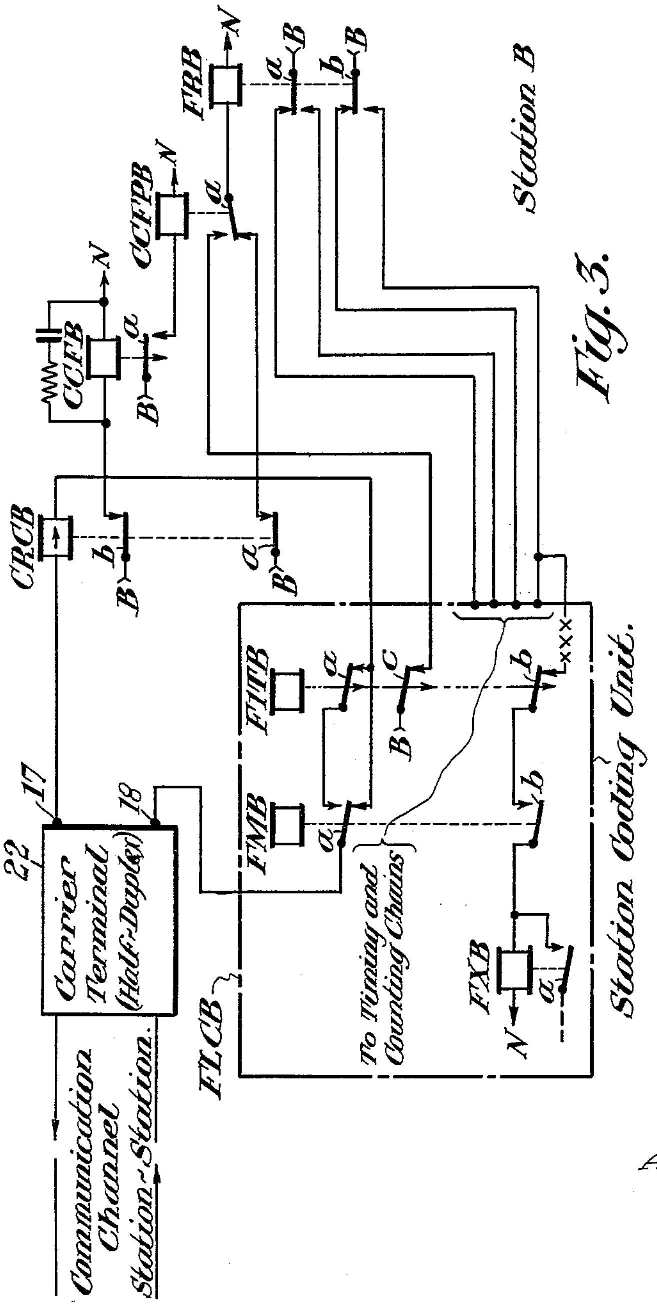
FIG. 3 illustrates the circuit arrangement at the last or final station in the remote control system, this station being the most distant from the office and also embodying the necessary circuits required by the form of my invention illustrated.
Figure 4:
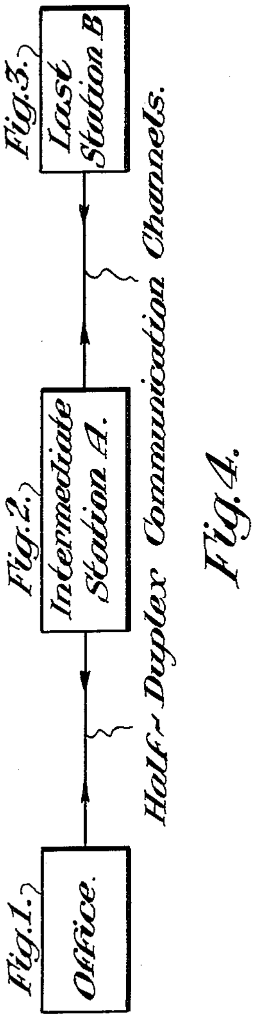
FIG. 4 is a schematic diagram of the remote control system which indicates the physical arrangement for FIGS. 1, 2 and 3 in order to provide a complete although abbreviated remote control system.

Referring again to the drawings, FIGS. 1, 2, and 3 thereof, when placed adjacent from left to right, as in FIG. 4, illustrate a simple remote control system including a control office or master station location, an intermediate station A, and a final or most distant station B. The office is connected to station A and station A to station B by individual communication channels, each considered to be of the half-duplex type. As specifically illustrated, each of these channels is shown as a carrier circuit or channel. One convenient type which is frequently used is the type 43A1 carrier circuit supplied by the various Bell Telephone Companies. However, it is to be understood that my invention may be applied to systems using other types of carrier channels and to systems in which direct current line circuits are provided. Each of the communication channels illustrated, being of the carrier type, is provided with a carrier terminal at each end. These terminals are illustrated in a conventional manner by a solid line rectangle appropriately designated. The details of the carrier terminal do not form any part of my invention since various kinds and types may be used and thus these details are not shown in the present drawings. At each location, various local line circuit connections between station terminals on the carrier terminal units are illustrated which include relays and relay contacts, as will be described in detail hereinafter.

Each carrier circuit used in the specific illustration is assumed to be normally active as long as the local line circuit connections at each terminal are closed, that is, form a complete circuit. Under these conditions, each carrier receiver relay connected in the local circuits to the carrier terminal is normally energized. However, other arrangements may be used in which the carrier receiver relays may be normally deenergized. Whether the carrier circuits are normally active or normally inactive, the principles embodied in the operation of the circuits of my invention are the same.

In the present showing, with normally active carrier circuits, the office indication carrier receiver relay OIRC in FIG. 1 is normally energized by a local circuit extending from terminal 11 of the office carrier terminal 19 through back contact *b* of the office first transmitter relay O1T and the winding of relay OIRC to terminal 12 of the carrier terminal. It is to be noted that relay OIRC is of the biased type, as designated by the arrow shown within the winding symbol for the relay. The actual direction of current flow in the above described local circuit connections is not shown. It is assumed, however, that under normal operating conditions, with the local circuits closed, the flow of current is from terminal 11 through the circuit to terminal 12 of the carrier terminal and thus is in the proper direction to energize the relay to close its front contacts. At other locations, the carrier receiver relays are also energized, such as relays CRCA and IRC in FIG. 2 and relay CRCB in FIG. 3. The detailed circuits for these relays will be described shortly. The normally energized condition of relay OIRC is repeated by the office indication circuit fault monitor relay OICF, which is normally energized over front contact *b* of relay OIRC. Relay OICF is provided with slow release characteristics which are aided by the capacitor-resistor snub connected in multiple with the relay winding. During normal coding action of relay OIRC, front contacts of relay OICF remained closed. If a fault condition interrupts the indication circuit for a period longer than a complete code, relay OICF releases to permit transmission of control codes, as will be described hereinafter. The circuit for relay OIRC, as previously described, includes a contact of the office first transmitter relay O1T, this relay being part of an office coding unit OLC which is conventionally shown by a dot-dash rectangle in FIG. 1. The circuitry within unit OLC is shown only partially in detail, as required for an understanding of my invention, as such coding units are well known in the art and may be considered as standard equipment. For example, the office coding unit OLC, as in FIG. 1, may be generally as shown as part of the remote control system disclosed in my prior patent No. 2,442,603 granted June 1, 1948, for Remote Control Systems, or as shown in patent No. 2,698,425, granted December 28, 1954, to A. B. Miller for Remote Control Systems. Except as specifically shown or modified herein, reference is made to these prior patents for complete details of the apparatus and circuits within an office coding unit such as intended for use in the present system. Additional reference will be made to these prior patents as the occasion arises in the present specification.

Specifically, there is shown within unit OLC in FIG. 1 the timing chain relays O1L, O2L, OLP, OLB, OLBP, and OLBPS. However, only symbols for the windings of these relays are indicated, the control circuits being similar to those shown in my prior patent so that by reference thereto the circuits and the chain operation may be fully understood without a specific description in the present case. In addition to the office first transmitter relay O1T, a second office transmitter relay O2T is shown to provide a full understanding of the system operation. Master relay OM and synchronizing relay OX complete the relays presently shown within coding unit OLC, the remainder of the details forming no part of my invention and being unnecessary for an understanding thereof.

The circuit arrangement specifically shown for transmitter relays O1T and O2T in the drawings corresponds generally to that shown in the previously mentioned patents. However, when relay OM is energized to initiate a control code, an initial energizing circuit for relay O1T is completed from terminal B at back contact *a* of bridging repeater stick relay OLBPS over front contact *b* of relay OM, back contact *b* of relay O2T, and the winding of relay O1T to terminal N. When relay O1T, thus energized, picks up to close its front contacts, the energizing circuit for relay O2T is completed over front contacts *c* of relays O1T and OM, and relay O1T likewise picks up. The original energizing circuit for relay O2T is then transferred to a stick circuit over front contact *b* of relay O2T and front contact *a* of relay O1T. When relay OLBPS eventually picks up at the end of the timing chain action as explained in my prior patent, the stick circuit for relay O1T is transferred to the path in multiple with back contact *a* of relay OLBPS which leads from the stepping controls of the counting chain relays as indicated on the drawing. Additionally, the stick circuit for relay O1T may be completed at selected times from the station and control function selection circuits which are external to unit OLC. Similar stick circuits for relay O2T from the stepping controls or from the station and control function selection circuits are completed over front contact *a* of relay O2T, back contact *c* of relay O1T, and front contact *c* of relay OM to the winding of relay O2T. As explained in either of the two reference patents, relays O1T and O2T are periodically energized and then release to form the odd and even-numbered steps, respectively, of control codes. The length of each step is determined by the path over which the stick circuit for the corresponding relay is completed, that is, whether it is completed over the stepping controls or over the station and control function selection path, the latter path creating the long code steps and the former the short code steps.

In the presently illustrated system, the periodic operation of relay O1T to alternately open and close its back contact *b* causes the transmission of a carrier current code over the communication channel to the stations. This coding action results from the periodic opening and closing of the local line circuit connections, extending between terminals 11 and 12 of carrier terminal 19, which include, as previously described, back contact *b* of relay O1T and the winding of relay OIRC. It is obvious that this latter relay likewise follows the transmitted code, alternately releasing and being reenergized on the open and closed steps, respectively, of the control code.

Just as relay OIRC follows the outgoing control codes, office line relay OR likewise repeats these codes. The normal control circuit for relay OR extends from terminal B over front contact *a* of relay OIRC, front contact *a* of relay OICF and the winding of relay OR to terminal N. It is obvious that relay OR is normally energized during inactive conditions and follows the coding action of relay OIRC due to the periodic opening and closing of front contact *a* of this latter relay. As will appear later, such coding action also occurs during the reception of incoming indication codes. A second circuit for relay OR includes back contact *a* of relay OICF and back contact *d* of relay O1T When relay OICF is released due to an indication circuit fault, this second circuit causes relay OR to repeat directly the coding action of relay O1T. Whichever circuit is effective, the operation of relay OR drives unit OLC to record an indication code, and to advance the coding action during control codes. This is accomplished by the periodic operation of contacts *a* and *b* of relay OR between their front and back positions to drive the counting and timing relay chains of unit OLC. This action is completely described in either of the previously mentioned reference patents. Only sufficient explanation is here given to aid in the understanding of the arrangement of my invention.

As particularly explained in my prior Patent 2,442,603, the initial operation of relay OR to close back contacts energizes the timing relay chain in cascade, so that timing relays O1L and O2L initially pick up followed in order by relays OLP, OLB, OLBP, and OLBPS. The last relay is provided with a stick circuit which includes a front contact of relay O2L. Relays O1L and O2L, followed by relay OLP whose contacts are not specifically involved in the details of the present circuits, alternately release during the long odd and long even-numbered code steps, respectively. The bridging relays OLB and OLBP, once energized, are provided with sufficient slow release characteristics to hold their front contacts closed during all coding action. Relay OLBPS likewise is held energized during normal coding action. It is to be understood that relay OR must follow control codes being transmitted by relay O1T in order to advance the coding action of the counting chains of unit OLC to properly control the code whose character is determined by the transmitter relays. Since this action is so thoroughly described in the reference patents and does not specifically enter into the operation of my invention, no mention is here made of the operation of the counting chain as driven by relay OR.

It is obvious from the circuits traced for transmitter relays O1T and O2T that master relay OM must be energized and in its picked-up position in order for control codes to be transmitted from the office location. The circuits for relay OM, as used in the system of my invention, are modified slightly from those shown in the previously mentioned reference patents. For example, the energizing circuit for relay OM may be traced from terminal B over back contact *b* of relay OX, front contact *b* of a second start repeater relay STPP, back contacts *a*, in series, of relays O2L and O1L, and the winding of relay OM to terminal N. In an initial stick circuit for relay OM, back contacts *a* of relays O1L and O2L are by-passed by back contact *a* of relay OLBP and front contact *a* of relay OM. The final stick circuit for relay OM includes back contact *c* of relay OX, various circuits within unit OLC shown conventionally by the symbol XXX, front contact *a* of relay OLB, front contact *a* of relay OLBP, and front contact *a* and the winding of relay OM. It is obvious that this latter stick circuit, once completed by the closing of front contacts of the bridging and bridging repeater relays OLB and OLBP, remains effective to hold relay OM energized until the end of a control code unless synchronizing relay OX becomes energized to reject or interrupt the code. The full purpose of the contacts of relay OX in these circuits for relay OM will appear hereinafter.

Synchronizing relay OX, shown within unit OLC, is equivalent to the similarly designated relays shown in the prior reference patents. Although only one auxiliary energizing circuit is here shown for relay OX, this relay is also provided with the usual energizing circuits shown in these prior art references. However, it is believed sufficient to here show only the auxiliary energizing circuit provided by the system of my invention, since the utility and operation of the other circuits are fully explained in the references and are not part of the details of my invention. The auxiliary energizing circuit for relay OX, here shown, extends from terminal B over front contact *b* of first start repeater relay STP, back contact *a* of relay STPP, back contact *d* of relay OM, and the winding of relay OX to terminal N. When the cascaded energization of the timing chain relays is completed, a stick circuit is closed for relay OX which includes front contacts *b* of relays OLBPS and OLBP and front contact *a* and the winding of relay OX. It is apparent that once energized, relay OX is held energized by the timing chain relays until coding unit OLC drops out and releases the timing relays.

For each station in the remote control system, a code starting relay ST is provided at the office or master station location. In keeping with the system shown in FIGS. 1, 2, and 3, starting relays AST and BST are provided, corresponding respectively to intermediate station A and final station B. Only the control windings of these relays are shown since the energizing circuits are of the usual type completely described in either of the aforementioned reference patents. It is sufficient to here understand that, when a control code is to be transmitted to a station, the corresponding start relay is energized to initiate the coding action. It is to be further understood that such a relay is provided for each station in the system, only two being shown here since the simplified control system includes but the two stations.

However, the manner in which the start relays control the initiation of code transmission is changed by the circuits of my invention. A first and a second start repeater relay are provided by my invention, each of the repeater relays repeating in cascade the energization of any start relay. In other words, first and second repeater relays STP and STPP are common to all start relays ST of the system. If coding unit OLC is inactive, energization of any start relay completes the circuit for energizing relay STP. For example, the circuit for energizing relay STP may be traced from terminal B over front contact *a* of relay AST, a preselected contact arrangement of the pyramid relays here indicated by the symbol XXX, back contacts *b*, in series, of relays O1L and O2L, and the winding of relay STP to terminal N. Thus energized, relay STP picks up to close its front contact *a*, thus completing an initial stick circuit including front contact *a* of relay AST and the contacts of the pyramid relays. The circuit arrangement through the contacts of the pyramid relays is here shown symbolically in order to simplify the circuit arrangement. Reference is made to the aforementioned patents for a complete understanding of the circuit detail. Two other stick circuits for relay STP are effective at times during the coding action. These two circuits are completed respectively over front contact *d* of relay O1T and front contact *e* of relay OM, each also including front contact *a* and the winding of relay STP.

The energizing circuit for relay STPP includes front contact *b* of relay OX, front contact *c* of relay OLBPS, front contact *c* of relay STP, and the winding of relay STPP. As will appear later, this energizing circuit is completed at an established time interval after the energization of relay STP. The stick circuit for relay STPP includes front contact *b* of relay STP and front contact *a* and the winding of relay STPP. It is obvious from the stick circuits provided for these repeater relays that they remain energized during control coding action whether it be one code or a sequence of codes. This eliminates, as will appear later, the necessity for a synchronizing cycle immediately preceding each of a sequence of successive control codes and thus saves coding time in the communication channel.

Considering now intermediate station A, shown in FIG. 2, it is to be seen that the communication channel from each direction into this station terminates in a carrier terminal similar to that discussed at the office location. Carrier terminal 20 at the upper left of FIG. 2 terminates the carrier communication channel extending between the office and station A or, in an enlarged system, between station A and the next station closer to the office. Carrier terminal 21 at the upper right of FIG. 2 terminates the near end of the carrier communication channel extending from station A to final station B of FIG. 3 or, in an enlarged system, from station A to the next more distant station in the system.

A carrier receiver relay is included in the local line circuit arrangement associated with each carrier terminal. Control carrier receiver relay CRCA is associated with carrier terminal 20 and receives the control codes from the office. Indication carrier receiver relay IRC is associated with carrier terminal 21 and receives indication codes transmitted from more distant stations of the system. The suffix A used in the reference character for the control carrier receiver relay and used also in connection with other relays at station A is to distinguish these relays from similarly designated relays having similar circuits and operation at station B. Each of the carrier receiver relays is of the biased type, as indicated by the arrow shown within the winding symbol. However, this description again assumes the proper direction of current flow through the relay windings from the carrier terminals under all conditions without further mention. The normal circuit for each receiver relay includes a contact of the other receiver relay at that intermediate station. For example, the normal circuit for relay CRCA may be traced from terminal 13 of carrier terminal 20 through the winding of relay CRCA, front contact *a* of relay IRC, and back contact *a* of master relay FMA to terminal 14 of the same carrier terminal. A similar circuit for relay IRC extends from terminal 15 of carrier terminal 21 over front contact *d* of relay CRCA in multiple with back contact *b* of transmission direction reversing relay RCD, back contact *c* of relay FMA, and the winding of relay IRC to terminal 16 of the same carrier terminal. Each of the receiver relays is thus normally energized during the inactive or at-rest condition of the system.

Relay CRCA is provided, in the system of my invention, with two cascaded repeater relays. The first of these repeater relays, the control circuit fault monitor relay CCFA, is normally energized over front contact *b* of relay CRCA. Relay CCFA is provided with slow release characteristics which are amplified by the capacitor-resistor snub connected in multiple with the relay winding in the usual manner. The resultant slow release period is sufficient to bridge the length of any complete code and thus holds front contacts of this relay closed during normal code following operation of relay CRCA. The second repeater, fault monitor repeater relay CCFPA, is normally deenergized and becomes energized over back contact *a* of relay CCFA upon release of this latter relay.

The code following operation of relay CRCA is also repeated by station line relay FRA. This later relay is normally energized by the circuit from terminal B over front contact *a* of relay CRCA, back contact *a* of relay CCFPA, and the winding of relay FRA to terminal N. It is obvious that relay FRA thus repeats the code following operation of contact *a* of relay CRCA. However, if a control circuit fault occurs which results in the release of relay CCFA and the energization of relay CCFPA, the control of relay FRA is transferred, over front contact *a* of relay CCFPA, to back contact *c* of a first transmitter relay F1TA for this station, the circuit further including back contact *c* of indication receiver repeater relay IRCP. Under such fault conditions, relay FRA repeats directly the coded operation of transmitter relay F1TA, as will be discussed hereinafter. Relay FRA in turn, through the periodic operation of its contacts *a* and *b* between their front and back positions, drives the timing and counting relay chains of the station A coding unit FLCA which will be discussed shortly.

The indication carrier receiver relay IRC is provided with three repeater relays which operate in cascade. The first of these repeaters, relay IRCP, repeats directly, but in converse manner, the code following operation of relay IRC. Relay IRCP is energized by the circuit extending between terminals B and N and including the relay winding and back contact *b* of relay IRC. It is obvious that, when relay IRC releases, its first repeater relay IRCP is energized and vice versa. Indication circuit fault monitor relay ICF is normally energized over back contact *a* of relay IRCP. This circuit is thus interrupted each time relay IRC releases to energize its first repeater. However, relay ICF is provided with slow release characteristics which are further amplified by the capacitor-resistor snub connected in multiple with the relay winding. This slow release period is sufficient to bridge all coding action, the relay releasing only after a selected interval of deenergization which exceeds the length of a complete code. Relay ICF is repeated by the fault monitor repeater relay ICFP which is energized over back contact *a* of relay ICF.

Each station in the illustrated system is provided with a station coding unit such as unit FLCA in FIG. 2. These units are similar to the office unit OLC of FIG. 1, and to the station units shown in the aforementioned Miller Patent 2,698,425. It may also be considered as similar to the office coding unit shown in my prior patent, especially in connection with the timing chain relays. In the present illustrations, only those relays which are necessary for an understanding of the system of my present invention are shown within the units FLC. Thus, at staion A, unit FLCA is shown as including a master relay FMA, a first transmitter relay F1TA, the last relay of the timing chain, bridging repeater stick relay FLBPSA, and a synchronizing and lockout relay FXA. The circuits for the first three relays are not shown as they are similar to those of the reference patents and the circuit details therein may be studied for an understanding of the control and operation of these relays. However, a station synchronizing and lockout relay such as relay FXA is not shown in the prior Miller system. This relay may be considered to serve a similar purpose, and may be controlled in similar manner, to code disagreement relay CD shown at the field station in the system disclosed in my prior Patent No. 2,411,375, issued November 19, 1946, for Remote Control Systems. Thus relay FXA is provided in the system of my present invention to lock out the coding unit FLCA if an improper or incorrect code condition occurs. It is thus also similar in purpose to relay OX at the office but, if energized, serves to interrupt the energizing and stick circuits for relay FMA and the stepping circuit for relay F1TA.

The energizing circuit for relay FXA, shown in some detail to provide a better understanding of system operation, energizes the relay if an out-of-correspondence condition occurs between the positions of relays FRA and F1TA during the transmission of an indication code. Under such condition, a completed circuit extends from terminal B over back contact *b* of relay FRA, certain circuit portions within unit FLCA designated by the symbol XXX which are conventional and not part of my invention, back contact *b* of relay F1TA, front contact *b* of relay FMA, and the winding of relay FXA to terminal N. A conventional stick circuit is shown for relay FXA which includes its own front contact *a* and front contact *a* of relay FLBPSA. It is to be understood that this stick circuit could also be completed, in a manner similar to that shown for relay OX at the office location, over a front contact of a bridging repeater relay FLBPA, not shown but one of the timing chain relays of unit FLCA and which also remains energized during coding action.

Each intermediate station is provided, in the system of my invention, with a transmission direction reversing relay RCD. This relay is used to reverse the direction of communication for lockout purposes so that control codes may be transmitted and indication codes locked out. In other words, this relay reverses the direction of transmission through an intermediate station from a normal condition of readiness to transmit an indication code to the condition of readiness to transmit a control code. Relay RCD is provided with a plurality of energizing circuits. A first circuit, which is operative when a control code is first received from the office, extends from terminal B at front contact *a* of relay CCFA over back contact *c* of relay CRCA, back contact *b* of relay IRCP, front contact *c* of relay IRC, and the winding of relay RCD to terminal N. A second circuit, which is completed when station A initiates the transmission of an indication code, includes the winding of relay RCD and front contact *d* of relay FMA, which is closed under transmitting conditions. An auxiliary circuit is provided which is operative if an indication circuit fault has occurred so that relay IRC is released for a relatively long period. This circuit includes front contact *a* of relay CCFA, back contact *c* of relay CRCA, front contact *a* of relay ICFR, back contact *c* of relay IRC, and the winding of relay RCD. Under normal conditions, relay RCD, when energized, picks up and completes a first stick circuit that includes its own front contact *a*, back contact *a* of relay ICFP, back contact *c* of relay IRC, which closes shortly after a control code starts, and the winding of relay RCD. Upon the completion of the energizing action of the timing relay chain of unit FLCA, the stick circuit extending from front contact *a* of relay RCD is transferred to include front contact *a* of relay FLBPSA and thence to the winding of relay RCD. This second stick circuit is effective to retain relay RCD energized throughout the length of the control coding action. Contacts of relay RCD are interposed in the already described local line circuit connections for each of the carrier terminals and serve to bypass, under certain conditions, contacts of the carrier receiver relays. The utility of this arrangement will be more fully described hereinafter during the description of the system operation.

When an indication code is to be transmitted from station A, the energization of relay FMA to initiate the coding action transfers the local line circuit connections for carrier terminal 20 from back contact *a* to front contact *a* of relay FMA, thus including in the circuit back contact *a* of relay F1TA in place of front contact *a* of relay IRC. In a manner similar to that described for the control coding action, relay F1TA is periodically energized and released in accordance with the characteristics of the indication code to be transmitted. The periodic opening and closing of its back contact *a* likewise opens and closes the local line circuit connections which also include the winding of relay CRCA. This causes the transmission of coded carrier from carrier terminal 20 toward the office. Relay CRCA likewise follows this code, as is obvious, and through the periodic opening and closing of its front contact *a* drives line relay FRA. This latter relay in turn, through the operation of its contacts *a* and *b*, drives unit FLCA to advance the coding action in the usual manner. The opening of back contact *c* of relay FMA interrupts the local line circuit connections for the communication channel extending to the more distant stations and thus all such stations are locked out by the resulting open circuit condition during this indication code. Relay IRC likewise releases, but this has no effect upon the operation at this time.

During the reception of a control code from the office, relay CRCA again drives relay FRA which in turn drives the coding unit to receive the code whether or not the particular code selects this station for the registration of the control functions. In addition to driving relay FRA, the operation of relay CRCA, through its front contact *d*, retransmits the received code over the communication channel extending to the more distant stations. During this coding action, back contact *b* of relay RCD, which is in multiple with front contact *d* of relay CRCA in the local line circuit connections for unit 21, is open because of the previously explained energization of relay RCD. Thus front contact *d* of relay CRCA alone controls these line circuit connections. It is to be noted that, under these circumstances, front contact *b* of relay CCFPA, also connected in multiple with contact *d* of relay CRCA, is open, which is its normal condition. Since the local line circuit connections between terminals 15 and 16 include the winding of relay IRC, this latter relay likewise follows the control coding action.

Indication codes from more disatnt stations are received by relay IRC through the coding action over the channel terminating at carrier terminal 21. Contact *a* of relay IRC periodically opens and closes to retransmit this indication code to the office location through terminal unit 20. Since these line circuit connections also include relay CRCA, this relay follows the indication code and drives relay FRA in a similar pattern. Operation of relay FRA drives the local coding unit FLCA to keep the station busy and prevent interference with the indication code being transmitted to the office by another station.

The circuit arrangement at the last station, as illustrated in FIG. 3, is slightly different from that at the intermediate stations, and is considerably simpler in operation. Again, the communication channel from the next station toward the office terminates in a carrier terminal unit 22. The final station local line circuit connections include control carrier receiver relay CRCB, also of the biased type. The usual circuit extends from terminal 17 of unit 22 through the winding of this relay and back contact *a* of master relay FMB to terminal 18 of the carrier unit. Relay CRCB is thus normally energized during the inactive condition of the system but operates to follow the pattern of control codes received over the communication channel. Two cascaded repeater relays for relay CRCB are provided. Control circuit fault monitor relay CCFB is normally energized over front contact *b* of relay CRCB. Relay CCFB has slow release characteristics which are also further amplified by the capacitor-resistor snub connected in multiple with the relay winding. The relay thus has a sufficient slow release period to bridge normal coding action, releasing only if a control circuit fault occurs so that relay CRCB releases for a period exceeding the length of a complete code. Control circuit fault monitor repeater relay CCFPB is normally deenergized and becomes energized upon the release of relay CCFB to close its back contact *a*. These cascaded repeaters are similar in operation to those described in connection with relay CRCA at station A.

When an indication code is to be transmitted from this location, relay FMB is energized, in a manner previously explained for station A, and closes its front contact *a* to include back contact *a* of transmitter relay F1TB in the local line circuit connections. Relays FMB and F1TB are part of station coding unit FLCB which is similar to the coding unit illustrated at station A in FIG. 2. Again, this unit, shown conventionally by the dot-dash rectangle, is similar to that discussed and described in the previously mentioned reference patents and only such circuit details as are necessary for an understanding of my invention are shown here. During the transmission of indication codes, the periodic opening and closing of back contact *a* of relay F1TB causes a code of similar pattern to be transmitted from carrier terminal 22. Relay CRCB, whose winding is included in the local line circuits, likewise follows this coding action.

Code following operation of relay CRCB, whether it be receiving a control code or during the transmission of an indication code, drives station line relay FRB. The circuit for this latter relay, which is normally energized, extends from terminal B over front contact *a* of relay CRCB, back contact *a* of relay CCFPB, and the winding of relay FRB to terminal N. It is obvious that the coding action of contact *a* of relay CRCB causes relay FRB to follow a code of a similar pattern. The operation of contacts *a* and *b* of relay FRB, between their front and back positions, drives the timing and counting chain relays of station coding unit FLCB. This operation is similar to that at other stations and is fully described in the reference patents. If a control circuit fault occurs so that relay CCFB releases and its repeater is energized, the control circuit for relay FRB is transferred over front contact *a* of relay CCFPB directly to back contact *c* of relay F1TB. Under these conditions, the coded operation of relay F1TB is repeated directly by relay FRB to drive the coding unit to advance the coding action during transmission of indication codes. Again for the purposes of illustrating my invention, a synchronizing and lockout relay FXB is provided in the station coding unit. This relay is similar to relay FXA shown at station A and is controlled in a similar manner, the circuit including back contact *b* of relay FRB, conventional circuit portions indicated by the symbol XXX, back contact *b* of relay F1TB, and front contact *b* of relay FMB. The usual type stick circuit for relay FXB is indicated conventionally by a dotted line and includes front contact *a* and the winding of relay FXB.

I shall now describe the operation of the system embodying my invention in transmitting codes in each direction over the communication channels connecting the office and the various stations. I shall first assume that an indication code is to be transmitted from station B in order to transfer new items of information to the control office. As described in my prior patents or the Miller patent, a change in an indication function at the station initiates the transmission of an indication code by energizing, through a station start relay, the station master relay, here relay FMB. This action is followed by the initial energization and resulting pickup of the first transmitter relay F1TB. As explained fully in the references and as described briefly in connection with the office coding unit, relay F1TB and a corresponding second transmitter relay, which is not here illustrated, each periodically pick up and release to form an indication code that is to be transmitted. These relays are held energized over station selection and indication function selection circuits to form the long code steps of the time code system. Short steps are formed in a manner similar to that described at the office by the stepping control circuits which include contacts of the counting chain relays.

It is obvious that, with relay FMB picked up to close its front contact *a*, the local line circuit connections at station B, including the winding of relay CRCB, are controlled by back contact *a* of relay F1TB. As this contact periodically opens and closes during the coding action, carrier terminal 22 is controlled to transmit, over the communication channel toward the office, a coded carrier current having a pattern similar to that of the transmitter relay operation. In addition, relay CRCB follows the same code pattern. Due to the periodic operation of front contact *a* of relay CRCB, relay FRB is periodically deenergized and reenergized and in turn drives coding unit FLCB to advance the coding action throughout the length of the indication code. Reference is made to the aforementioned patents for a complete description of this operation. It is sufficient here to understand that as a result of the coding operation a coded carrier current, previously described, is transmitted toward the office by carrier terminal 22 at this station. Since relay CCFB is provided with a sufficient release period to bridge the coding action, it maintains its back contact *a* open so that relay CCFPB is not energized at this time.

Referring now to station A in FIG. 2, relay IRC, controlled through carrier terminal 21, follows the code pattern transmitted from station B. In other words, the coded carrier current from station B is received by carrier terminal 21 and, through the local line circuit connections between terminals 15 and 16, relay IRC is controlled to follow the same code pattern. Since, as will be explained shortly, relay CRCA will also be following the code pattern, the local line circuit connections including relay IRC and back contact *c* of relay FMA are carried over back contact *b* of relay RCD under these circumstances to bypass front contact *d* of relay CRCA.

As relay IRC follows the code received from station B, its front contact *a* periodically opens and closes, thus coding the local line circuit connections across terminals 13 and 14 of carrier terminal 20, causing this carrier terminal to transmit a coded carrier current having a similar code pattern over the communication channel toward the office location. Since the winding of relay CRCA is included in these local line circuit connections, this relay likewise follows the code pattern. Relay CRCA, in following the coding action, thus periodically closes and opens its back contact *c*. However, relay RCD is not energized under these conditions since at the beginning of each open circuit code step, front contact *c* of relay IRC opens prior to the closing of back contact *c* of relay CRCA, thus interrupting the energizing circuit for relay RCD at this instant. When relay IRC picks up at the beginning of the following line closed code step, its front contact *c* closes prior to the time relay CRCA opens its back contact *c*. At this moment, the energizing circuit for relay RCD remains open at back contact *b* of relay IRCP. This relay is obviously energized over back contact *b* of relay IRC each time this latter relay releases. Relay IRCP is provided with a half-wave rectifier connected in multiple with the relay winding to slightly retard the release of the relay upon deenergization when back contact *b* of relay IRC opens. This assures that back contact *c* of relay CRCA will reopen at the beginning of each closed line code step before the circuit for relay RCD is completed at back contact *b* of relay IRCP.

The operation of relay CRCA to periodically open and close its front contact *a* drives line relay FRA which in turn causes coding unit FLCA to operate. This maintains the coding unit busy during the period of transmission of the indication code from station B and prevents any interference by this coding unit with the code transmission. It is obvious, of course, that relays CCFA and ICF, although periodically deenergized during this coding action, have sufficient slow release periods to maintain their front contacts closed and back contacts open during this action.

At the office location, FIG. 1, the coded carrier current is received over the communication channel by carrier terminal 19. In turn, this carrier terminal transmits coded direct current pulses through the local line circuit connections between terminals 11 and 12. Relay OIRC follows this coded current to repeat the pattern of the indication code originally transmitted from station B. The periodic opening and closing of front contact *a* of relay OIRC drives office line relay OR to also follow the code pattern, the control circuit also including front contact *a* of relay OIFC which remains closed during the coding action due to the slow release characteristics of relay OIFC. The coded operation of contacts *a* and *b* of relay OR drives office coding unit OLC to receive and register the indication code. This action of the coding unit is fully described in the aforementioned reference patents from which a full description may be obtained if desired.

If an incorrect code step or an extra induced pulse is received during this indication code due to some momentary fault on the communication channel so that disagreement occurs in the coding unit operations, relay OX is energized over one of the circuits connected in multiple at terminal 23 of the coding unit as indicated by the multiple connection symbol at that location. If relay OX is energized, it in turn energizes relay O1T over the circuit including front contact *d* of relay OX and back contacts *b* of relays OM and O2T. This causes the transmission of a long open circuit, code rejection pulse from the office which will lock out the various station coding units and cause the system to reset to its inactive condition after which the indication code may be retransmitted. This action is usual in such remote control systems and complete details of the circuits controlling relay OX are available from the aforementioned patents. The transmission of the code rejection pulse from station to station will be fully described hereinafter.

I shall now assume that an indication code is to be transmitted from station A. Again this code is initiated, providing conditions are proper, that is, the system is inactive, by the energization of the station master relay FMA over contacts of the station start relay. The transfer of the local line circuit connections from back contact to front contact *a* of relay FMA includes back contact *a* of the relay F1TA in these connections. The initial opening of back contact *a* of relay F1TA thus interrupts the line circuit connections between terminals 13 and 14 and initiates the transmission of a carrier current code to the office, the initial step being an open line step. Since the winding of relay CRCA is still included in these line circuit connections, this relay releases during the initial step and then periodically picks up and releases as the code progresses. The corresponding operation of front contact *a* of relay CRCA again drives line relay FRA which in turn, through its contacts *a* and *b*, drives station coding unit FLCA to advance the coding action from step to step in the usual manner.

The opening of back contact *c* of relay FMA interrupts the local line circuit connections between terminals 15 and 16 of carrier terminal 21, thus causing the removal of the control carrier current from the communication channels to more distant stations. This locks out all such stations by the release of carrier receiver relays such as relay CRCB at station B. No interference with the coding action can thus occur from these distant stations. The actual lockout operation of the coding unit at each such station is controlled by the release of the local line relay, such as relay FRB at station B. Since this relay remains released, the coding unit is locked out until the system resets at the end of the indication code from station A. Relay IRC at station A likewise is released under these conditions. However, relay ICF and the various control circuit fault monitor relays such as relay CCFB at station B have sufficient slow release periods, as previously described, to bridge the entire code period so that their front contacts remain closed under these conditions and no transfer of operations as under fault conditions occurs.

At the office or master station location, relay OIRC again follows the code transmitted from station A into carrier terminal 19 at the office. As previously explained, a similar code pattern of direct current pulses is transmitted from carrier terminal 19 over the line circuit connections between terminals 11 and 12. Relay OIRC drives relay OR, as previously described, and the code is received and registered by office coding unit OLC. During the description of the transmission of indication codes from stations B and A, respectively, it was assumed that there was no control code transmission from the office location and that no control code was stored or initiated at this location for transmission.

I shall now assume that a control code is to be transmitted from the office to one of the stations of the system. The control code transmission is initially stored by the system operator energizing one of the start relays, as a specific example, relay BST. This occurs after the various control functions, which he desires to transmit, have been selected upon the control panels. In the systems described in the aforementioned reference patents, with a start relay energized and the system inactive, as indicated by the released condition of the timing chain in the office coding unit, the office master relay OM will be energized and pick up. However, in a system embodying my invention, with office coding unit OLC at rest so that relays O1L and O2L are both released, the energization of relay BST, for example, completes a circuit for energizing repeater relay STP. This circuit, previously traced, includes front contact *a* of relay BST, preselected circuit arrangements within the pyramid relay banks indicated by the symbol XXX, and back contacts *b* of relays O1L and O2L, which indicate the inactive condition of the system and confirm that it is proper for relay STP to be energized. It is to be noted that relay OM is held deenergized at the present instant by open front contact *b* of relay STPP. When relay STP picks up, it is initially held energized by the stick circuit including its own front contact *a*, the pyramid relay circuits, and front contact *a* of relay BST. This circuit remains effective until coding action is actually initiated after the synchronizing period to be described. If an indication code is already being transmitted from one of the stations and its reception has progressed at least through the first code step, either relay O1L or relay O2L will be picked up so that the circuit for relay STP can not be completed by the energization of a start relay at the office. Thus the control code, or more specifically, the synchronizing period, can not be initiated until the indication code has completed.

When relay STP picks up, the closing of its front contact *b* completes the circuit for energizing relay OX since relay OM is released at this time. This energizing circuit includes front contact *b* of relay STP, back contact *a* of relay STPP, and back contact *d* of relay OM. Relay OX picks up and closes its front contact *d* to energize relay O1T, this circuit further including back contacts *b* of relays OM and O2T. Since front contact *c* of relay OM is open, relay O2T is not energized at this time by the closing of front contact *c* of relay O1T. However, the closing of front contact *d* of relay O1T does provide a second stick circuit for relay STP which is briefly effective in the event that the original stick circuit should be momntarily interrupted within the pyramid relay banks.

The opening of back contact *b* of relay O1T interrupts the local line circuit connections between terminals 11 and 12 of carrier terminal 19 and causes a line open pulse to be transmitted toward the stations over the communication channel. Relay OIRC is also deenergized by the interruption of the line circuit connections and releases to in turn deenergize relay OR whose contacts *a* and *b* thus close in their back position. This initiates a pulse action in coding unit OLC so that the timing chain relays pick up in cascade in the manner fully described in my prior Patent 2,442,603. As a result of this cascaded pickup action of the timing relays, relay OLBPS is eventually energized and picks up. This completes the stick circuit for relay OX which includes front contacts *b* of relays OLBPS and OLBP in addition to front contact *a* and the winding of relay OX. The action at the various stations as a result of the line open pulse transmitted at this time will be discussed shortly, following the description of the rest of the office location action.

With relays OX, OLBPS, and STP picked up at this time, the circuit is completed for energizing relay STPP. This circuit includes front contact *b* of relay OX and front contacts *c* of relays OLBPS and STP. Relay STPP, thus energized, picks up, closing its front contact *a* to complete a stick circuit also including front contact *b* of relay STP. The opening of back contact *a* of relay STPP interrupts the energizing circuit for relay OX but the stick circuit for this relay, already complete as described above, retains relay OX energized at the present time. Although front contact *b* of relay STPP is closed, the circuit for relay OM is now interrupted at back contacts *a* of relays O1L and O2L.

Since relay OR remains released, there being no further coding action immediately by relay O1T to reclose the line circuit connections, office coding unit OLC drops out into a reverse lockout condition. That is, the timing chain relays, beginning with relay O1L which is deenergized when relay OLBPS picks up, are deenergized in cascade, each by the release, at the expiration of each flow release period, of the preceding relay in the order O1L, OLP, OLB, and OLBP. However, as shown in my prior patent, relay O2L is held energized over a back contact of relay OR and thus relay OLBPS is held energized by its stick circuit controlled by relay O2L. When front contact *b* of relay OLBP opens, the stick circuit for relay OX is interrupted and this relay releases. The opening of front contact *d* of relay OX interrupts the energizing circuit for relay O1T and this latter relay shortly releases, at the end of its slow release period, to close, at its back contact *b*, the line circuit connections between terminals 11 and 12. Relay OIRC is thus reenergized and picks up, reenergizing in turn relay OR which likewise picks up.

The closing of front contacts of relay OR reenergizes relay O1L which picks up and is followed in cascade by the pickup of relays OLP, OLB, and OLBP. However, the opening of back contacts of relay OR deenergizes relay O2L and at the end of its slow release period, this relay releases. Since relay OR is held energized at the present time due to relay O1T remaining released, the timing chain relays again drop out but in a normal reset manner. Relay O1L is the last to release, following the release of all other timing relays including relay OLBPS.

The release of relay O1L at the end of this reset period completes the energizing circuit for relay OM. Relay STPP is held energized by the stick circuit including front contact *b* of relay STP, held energized in turn by its initial stick circuit which includes, in this specific example, front contact *a* of relay BST and the pyramid relay contacts. Thus the circuit for relay OM is completed from terminal B at back contact *b* of relay OX over front contact *b* of relay STPP, back contacts *a*, in series, of relays O2L and O1L, and the winding of relay OM to terminal N. Relay OM, thus energized, picks up and completes a stick circuit at its front contact *a* which also includes back contact *a* of relay OLBP to initially bypass back contacts *a* of relays O1L and O2L. The closing of front contact *e* of relay OM completes a final stick circuit for relay STP, which thus remains energized as long as relay OM is picked up, that is, during the control code. It is thus obvious that relays STP and STPP are held energized during the complete control code, once the coding action is initiated.

With relay OLBPS released to close its back contact *a*, the closing of front contact *b* of relay OM completes the circuit for energizing relay O1T, this circuit further including back contact *b* of relay O2T. Relay O1T picks up to initiate the control code, the first step thus being a line open period due to open back contact *b* of relay O1T. The closing of front contact *c* of relay O1T with front contact *c* of relay OM already closed energizes relay O2T. The control coding action continues from this point with relays O1T and O2T operated by the usual energizing and stick circuits to provide the selected code pattern of long and short code steps for, in the specific example here, the selection of station B and the selection of the desired control functions. Again reference is made to the previously mentioned reference patents for a complete description of the coding operation within office coding unit OLC including the associated station and control function selection circuit. The control of relay OX is transferred from back contact to front contact *d* of relay OM at the initiation of the control code so that the regular circuits for relay OX within the coding unit are utilized to check the code transmission during the remainder of the control code. Relay OX is thus removed from the initial synchronizing control circuit which is connected to terminal 23 of coding unit OLC.

At station A, the reception of the initial line open synchronizing pulse releases relay CRCA. The opening of front contact *a* of this relay releases line relay FRA to drive coding unit FLCA to an initial step through the closing of back contacts *a* and *b* of relay FRA. The timing relay chain of this coding unit energizes in cascade in a manner similar to that of the office coding unit ending with the energization of relay FLBPSA. The closing of back contact *c* of relay CRCA energizes relay RCD to reverse the direction of transmission in the system at this station. The circuit for relay RCD includes front contact *a* of relay CCFA, back contact *c* of relay CRCA, back contact *b* of relay IRCP, front contact *c* of relay IRC, and the winding of relay RCD. This circuit is completed momentarily by the release of relay CRCA prior to the release of relay IRC which will be discussed shortly. With front contact *d* of relay CRCA already open, the opening of back contact *b* of the relay RCD interrupts the local line circuit connections for the distant communication channel, that is, the circuit connections between terminals 15 and 16 of carrier terminal 21. Relay IRC is thus deenergized and releases, completing at its back contact *c* a first stick circuit for relay RCD which further includes back contact *a* of relay ICFP and front contact *a* of relay RCD. When relay FLBPSA picks up, the closing of its front contact *a* completes the final stick circuit for relay RCD, this front contact bypassing the series circuit through back contact *c* of relay IRC and back contact *a* of relay ICFP. The closing of front contact *c* of relay RCD bypasses front contact *a* of relay IRC in the line circuit connections between terminals 13 and 14 of carrier terminal 20 so that relay CRCA is thus responsive only to the code pulses received over the communication channel from the office location.

The line open pulse transmitted from carrier terminal 21, due to the opening of its local line circuit connections at the time that relay RCD opens back contact *b*, cascades through all intermediate stations in a similar fashion to that just described for station A. In the abbreviated system here shown, this line open pulse reaches station B from station A through carrier terminal 22 and causes the release of relay CRCB. The opening of front contact *a* of this relay deenergizes relay FRB which releases to pulse coding unit FLCB. In the same manner as that described for the coding unit at station A, the timing chain relays of unit FLCB pick up in cascade.

At each station, the long line open synchronizing pulse causes the timing chain relays to drop out in the reverse manner similar to the office action. In other words, the timing chain relays are deenergized by the associated station line relay FR remaining in its released position so that they release in cascade except for relays 2L and LBPS, corresponding to relays O2L and OLBPS at the office, which are held energized over back contacts of relay FR. This long synchronizing pulse is of sufficient length to override any indication code pulse and assure the completion of the reverse dropout action and attainment of a lockout condition at each station.

If any remote station has initiated an indication code simultaneously or substantially simultaneously with the initiation of the control code at the office location, release of line relay FR at that station halts the coding action of the FLC unit. At this station which has initiated an indication code and thus is conditioned as a transmitter, the station timing relays release in the same manner as at any other station, that is, a reverse dropout action occurs. In addition, since this initial synchronizing pulse is of longer duration than any ordinary code pulse, an out-of-correspondence condition shortly occurs in which relays FR and F1R are both released. When this condition occurs, for example, at station A, a circuit is established from terminal B over back contact *b* of relay FRA, certain conventional connections within coding unit FLCA indicated by the symbol XXX, back contact *b* of relay F1TA, front contact *c* of relay FMA which is closed because the station, having initiated an indication code, is conditioned to transmit, and the winding of relay FXA to terminal N. Relay FXA, thus energized, picks up and completes its stick circuit shown as including front contact *a* of relay FLBPSA which remains energized under the reverse dropout conditions. Relay FXA then interrupts the stick circuit for relay FMA to convert that station from a transmitter into a receiver.

It is to be noted that, due to transmission delay, the reception of this initial synchronizing pulse at the more distant stations in an extensive system may not occur until after a simultaneous indication code has progressed through several code steps. However, the synchronizing pulse will still lock out the station in a manner similar to that just described with the result that the synchronizing relay FX at the station is energized by this out-of-correspondence condition between the associated line relay FR and first transmitter relay F1T. This synchronizing action thus synchronizes the system into a reverse dropout condition regardless of any pulse delay time which may be inherent in the communication channel in use. By the end of the initial synchronizing pulse transmitted from the office, each station has undergone a reverse dropout action of its timing chain relays and is held in a locked-out condition unable to transmit an indication code. Also, any indication code which was simultaneously initiated has been interrupted and the corresponding coding unit has been transferred into a receiving condition.

The transmission of the second synchronizing pulse, i.e., the reset pulse, energizes all station line relays FR. For example, at station A the energization of relay CRCA closes its front contact *a* and thus reenergizes relay FRA. Similar action occurs at station B. At each station, the timing chain relays are reenergized in a manner similar to that described at the office and immediately initiate a normal dropout action beginning with the timing chain relay corresponding to relay O2L at the office. At each station, the timing chain relay corresponding to office relay O1L is the last timing relay to release. This dropout action resets the station to its normal inactive condition. The completion of this reset action of each station coding unit is synchronized with the office reset action with allowance for transmission delay times. Immediately following the release of each station timing chain relay 1L, the first regular control code step from the office is received at that station prior to the initiation of an indication code transmission. Under these conditions, the control code takes priority over all other coding action and completes its transmission to the selected station.

It may be noted at this time, with reference to FIG. 1, that if two or more control codes are stored, that is, if more than one start relay is energized to store the codes, relays STP and STPP are held energized at the completion of the initial control code transmission. It is obvious that the initial stick circuit for relay STP will remain effective over front contact *a* of relay AST, for example, when relay BST is released during the transmission of the corresponding control code. The portion of the stick circuit including contacts of the pyramid relays consists of several multiple channels so that at least one circuit path is continuous under these conditions. Thus, upon completion of the first control code, the energizing circuit for relay OM over front contact *b* of relay STPP is again completed by the release of relay O1L to close its back contact *a*. Relay OM is thus reenergized and picks up immediately to initiate a second control code without another set of lockout steps. In other words, only one synchronizing cycle with double dropout action is required for a series of control codes transmitted successively.

At each station, the control carrier receiver relay CRC follows the steps of the control code as transmitted by relay O1T and drives the local coding unit FLC through the action of line relay FR. In other words, during the control code to station B, for example, as was originally assumed, relay CRCB receives the control code steps in the same pattern as transmitted from the office over intervening carrier channels through carrier terminal 22. Relay CRCB in turn, by the periodic opening and closing of its front contact *a*, drives relay FRB. This latter relay, by the coding action of its contacts *a* and *b*, drives station coding unit FLCB to receive and register the code, this station being selected by this code and the control functions recorded.

Referring to station A in FIG. 2, it is to be noted that relay RCD is deenergized at the end of the synchronizing cycle reset step. This occurs when relay FLBPSA releases to open its front contact *a* and thus interrupt the existing stick circuit for relay RCD. The initial stick circuit is already open at back contact *c* of relay IRC which is reenergized when the second synchronizing step, a line closed pulse, is transmitted. However, during the first step of the actual control code, which is again a line open step transmitted by open back contact *b* of relay O1T at the office, relay RCD is reenergized through the circuit including back contact *c* of relay CRCA and front contact *c* of relay IRC. Relay RCD, thus energized, picks up and completes its initial stick circuit. This is shortly followed by the completion of its final stick circuit as described for the initial synchronzing step.

In the event that the office location rejects an indication code due to the incorrect transmission of the pulse combinations or to the introduction of extraneous pulses due to momentary fault conditions, relay RCD will be energized in a manner similar to that just described. As was previously indicated if an indication code is rejected by the office unit, relay OX is energized over one of the usual circuits connected to terminal 23 and in turn energizes relay O1T. The circuit for relay O1T is immediately completed since relay OM is released when indication codes are being received and relay O2T is inactive. Relay O1T opens its back contact *b* to interrupt the local line connections for carrier terminal 19 and a line open pulse is thus transmitted over the carrier channels which cascades from station to station. This pulse is longer than any indication pulse which is being transmitted into the office. Referring particularly to station A, and assuming that the indication code is originating at a distant station, if relay IRC is already picked up by the existing indication code step when this long line open pulse is received, the release of relay CRCA to close its back contact *c* immediately energizes relay RCD over the previously traced circuit. If, however, relay IRC is released by the existing indication code step when the code rejection occurs, relay CRCA is already released as the indication code step is being retransmitted to the office location. Then, at the end of the existing indication code step, relay IRC will pick up in response to the reception of the succeeding indication code step. Relay CRCA, under these code rejection conditions, remains released since relay O1T at the office is held energized by relay OX. As soon as relay IRC closes its front contact *c* and in turn relay IRCP, which is deenergized at the beginning of this code step, releases to close its back contact *b*, the circuit for relay RCD is completed since back contact *c* of relay CRCA remains closed. Relay RCD is thus energized and picks up. Its final stick circuit is immediately completed.

No matter on which code step relay RCD is energized, the long line open code rejection pulse from the office is repeated over the distant communication channel since the local line circuit connections between terminals 15 and 16 of carrier terminal 21 are interrupted at front contact *d* of relay CRCA and back contact *b* of relay RCD, these two contacts being in multiple in the circuit connections. The direction of transmission in the system is thus reversed, and the lockout step cascades throughout the system to halt all coding action and cause the system to reset to normal in a manner similar to that described for the synchronizing cycle preceding each control code. Relay RCD thus serves to reverse the direction of transmission at the beginning of control codes and in the event that an indication code is rejected due to incorrect transmission of the code steps. These actions are necessary in this system since, for normal operation, the communication channels must be prepared at all times for the initiation and transmission of indication codes. Thus provision is made for control codes or code rejection pulses to override and reverse the direction of transmission throughout the system to lock out the stations. Relay RCD also serves to eliminate the indication code in the event of simultaneous starting of a control and an indication code. Finally, relay RCD establishes priority between two or more indication codes which start simultaneously.

It is also desirable, in such a remote control system, to retain partial service during communication channel fault conditions which effect transmission in one direction only. This is the purpose of the fault monitor relays provided at the office or master station location and at each remote station. These are the slow release control circuit fault monitor relays CCF which are provided at each station and the slow release indication circuit fault monitor relays ICF provided at the office and at each intermediate station. As will be described, these relays make it possible for single direction service to be retained in the event that transmission in the opposite direction is halted by a fault condition.

Assume that a control circuit fails, for example, between the office location and first station A. Through the communication channel, control carrier receiver relays CRC at the various stations are released. At the end of the slow release period, the control circuit fault monitor relays CCF likewise release followed by the energization of their repeater relays CCFP. As a specific example, at station A, relay CRCA releases due to the fault and remains released. At the end of its slow release period, which is longer than the normal length of any complete code, relay CCFA releases, being deenergized by open front contact *b* of relay CRCA. The closing of back contact *a* of relay CCFA energizes relay CCFPA which picks up. A similar action occurs at station B as is obvious from a study of the circuits.

When relay CRCA releases, the previously traced circuit is completed to energize relay RCD which then picks up. The release of relay FRA following the release of relay CRCA causes coding unit FLCA to operate for an initial pulsing action, after which the timing chain relays drop out under reverse conditions. However, relay CCFPA, when energized, transfers the control of relay FRA from relay CRCA to back contact *c* of relay F1TA, the transfer occurring when front contact *a* of relay CCFPA is closed. This revised control circuit for relay FRA also includes back contact *c* of relay IRCP. This latter contact is open at this instant since relay IRC is deenergized, and relay IRCP thus energized, when the fault condition is retransmitted to the more distant communication channel by the opening of back contact *b* of relay RCD. However, when relay CCFPA is energized, it closes its front contact *b* to bypass the multiple circuit through front contact *d* of relay CRCA and back contact *b* of relay RCD. The local line circuit connections between terminals 15 and 16 of carrier terminal 21 are thus restored and relay IRC is reenergized. This deenergizes relay IRCP which shortly closes its back contact *c* to reenergize relay FRA over the above traced circuit. The closing of front contacts of relay FRA causes coding unit FLCA to operate through a reset step at the end of which all timing chain relays are released.

The opening of front contact *a* of relay FLBPSA at this time deenergizes relay RCD by interrupting its final stick circuit. It is to be noted that the first stick circuit for relay RCD is already open at back contact *c* of relay IRC and that the energizing circuit was interrupted when front contact *a* of relay CCFA opened. Since the fault condition was assumed to exist between the office and station A, the closing at this time of the local circuit connections for carrier terminal 21 retransmits the control carrier to station B causing relay CRCB to be reenergized. Thus at station B, relay CCFB is reenergized and picks up, followed by the release of relay CCFPB. Relay FRB, which had been placed in direct control of relay F1TB by front contact *a* of relay CCFPB, is now returned to its usual control circuit including front contact *a* of relay CRCB.

Indication codes may now be transmitted from any station to the office. This includes station A, since relay FRA is directly controlled by relay F1TA and will follow the coding action of coding unit FLCA through the operation of relay F1TA. For indication codes from more distant stations, the operation of relay IRC in following these codes retransmits the code to the office in the usual manner as explained before. If the control circuit failure occurs immediately beyond station A, control codes may still be transmitted to station A. However, although retransmission will occur, these codes will not be received at the more distant stations. Indication codes, however, may be transmitted from all of the more distant stations in the usual manner with the exception that, at the intermediate station immediately beyond the control circuit fault, relay FR will be controlled directly by relay F1T of the local coding unit.

I shall now assume that the indication circuit fails between stations A and B. Immediately upon the occurrence of this failure, relay IRC at station A and relay OIRC at the office release. At station A, relay IRCP is energized by the closing of back contact *b* of relay IRC and picks up, opening its back contact *a* to deenergize fault monitor relay ICF. At the office, the opening of front contact *b* of relay OIRC deenergizes the corresponding fault monitor relay OICF. Upon the opening of front contact *a* of relay IRC due to the circuit fault, relay CRCA is likewise deenergized by the interruption of the local line circuit connections between terminals 13 and 14 of carrier terminal 20. Release of relay CRCA deenergizes relay FRA while the opening of front contact *a* of relay OIRC deenergizes relay OR at the office. Eventually, at the end of their similar slow release periods, relays ICF and OICF release. At station A, the closing of back contact *a* of relay ICF energizes relay ICFP and this relay picks up. At the office, the release of relay OICF closes its back contact *a* to transfer the control of relay OR directly to back contact *d* of relay O1T. At station A, the closing of front contact *b* of relay ICFP bypasses open front contact *a* of relay IRC in the local line circuit connections between terminals 13 and 14 and relay CRCA is reenergized. If relay CCFA has released, it is now reenergized and relay CCFPA is deenergized, so that relay FRA is controlled in the usual manner by front contact *a* of relay CRCA. Under the assumed condition, relay OIRC at the office is likewise reenergized since indication carrier current is now being transmitted from station A to the office. Under this condition, relay OICF is reenergized and relay OR is returned to its normal control by front contact *a* of relay OIRC. Indication codes from station A can now be transmitted to the office even though station B is disabled. However, if the indication circuit fault is total or is between station A and the office, relay OIRC remains released and likewise relay OICF, so that relay OR is controlled directly by relay O1T. In any event, control codes may be transmitted from the office all the way to the final station.

At station A, the reception of an initial step of a control code results in the release of relay CRCA which completes, at back contact *c* of this relay, the circuit for relay RCD. This circuit at this time includes front contact *a* of relay CCFA, back contact *c* of relay CRCA, front contact *a* of relay ICFP, back contact *c* of relay IRC, and the winding of relay RCD. This auxiliary circuit is established in order to provide for the single direction operation in the event of an indication circuit fault. With relay RCD energized, front contact *d* of relay CRCA controls the line circuit connections between terminals 15 and 16 of carrier terminal 21 and thus the control code received from the office is retransmitted to the more distant communication channels. If the fault, as assumed, exists between stations A and B, indication codes may be transmitted from station A to the office during this fault condition. Normal operation will ensue with back contact *a* of relay F1TA controlling the transmission of the code through its insertion in the local line circuit connections when front contact *a* of relay FMA is closed to initiate the indication code.

It is evident from the preceding description that the system of my invention provides for the operation of a remote control system over half-duplex type communication channels from an office to a plurality of remote stations. The circuit arrangement of the system provides for the synchronization of code transmission in each direction, the synchronization cycle eliminating the effects of communication channel delay times upon pulse transmission. Through the synchronization arrangement, the loss of control codes or the incorrect reception of such codes due to substantially simultaneous initiation of indication codes is eliminated. All codes may be transmitted with proper reception at the selected location. At intermediate stations, the communication channel arrangement is always prepared for the transmission of indication codes from more distant stations to the office location. The system of my invention provides means whereby the direction of transmission is reversed through the intermediate station in order to permit the transmission of control codes to the more distant stations. This reversal action, when simultaneous indication codes are initiated at two or more stations, establishes preference for the code from the nearest station and eliminates the other codes which are stored for later transmission. By the same type of transmission reversal, indication codes which contain incorrect code steps may be rejected by the office and the system reset for a renewal of the indication code transmission. Further, systems embodying the circuits of my invention maintain continued service in both directions, in the event that the transmission circuits are interrupted by a single direction fault condition, between the office and those stations on the office side of the fault location. Single direction service opposite to the faulted direction is maintained with those stations beyond the fault location. This single direction operation is provided automatically in the event of a fault by the arrangement provided through the fault monitor relays. The remote control system embodying these arrangements may thus be operated over extensive distances using commercial communication channels of the half-duplex type without being effected by such transmission delay times or circuit faults as may exist from time to time.

Although I have herein shown and described but one form of remote control system embodying the synchronizing and coordinating circuits of my invention for operation over half-duplex channels, it is to be understood that various changes and modifications may be made therein within the scope of the appended claims without departing from the spirit and scope of my invention.

Having thus described my invention, what I claim is:

1. In a remote control system comprising a control office and a plurality of remote stations connected by a communication channel, a control means at said office operably connected to said channel for transmitting control functions to selected stations which are at times adapted to receive such control functions, an indication transmitting means at each station operably connected to said channel for transmitting indication functions from that station to said office which is adapted to receive such indication functions, said stations being normally conditioned for the immediate transmission of indication functions, synchronizing means at said office having connections to said communication channel and controlled by said control means when the transmission of a control function is actuated for conditioning each station to only receive control functions, said synchronizing means having other connections for delaying the actuated control function transmission until all stations are conditioned only to receive control functions.

2. In a remote control system comprising a control office and a plurality of remote stations connected by a communication channel, a control means at said office operably connected to said channel for transmitting control functions to selected stations which are at times adapted to receive such control functions, an indication transmitting means at each station operably connected to said channel for transmitting indication functions from that station to said office which is adapted to receive such indication functions, each indication transmitting means being normally conditioned for the immediate transmission of indication functions, a synchronizing means at said office responsive to the initiation of a control function transmission for actuating the transmission by said control means of a cycle of synchronizing signals over said channel effective to lock out each indication transmitting means to condition each station to only receive control functions, said control means being further controlled by said synchronizing means for delaying the control function transmissions until the completion of the synchronizing cycle transmission.

3. In a remote control system including a control office location and a plurality of stations connected by a communication channel, a control coding means at said office having connections to said channel for transmitting selective control functions to said stations and for receiving indication functions from said stations, indication coding means at each station having connections to said channel for transmitting indication functions to said office and for receiving said selective control functions, a fault monitoring means at each location operably connected to said channel for detecting a continued fault condition which interrupts transmission of functions in one direction between said office and said stations, said fault monitoring means at each location when a fault is detected controlling the channel connections of the corresponding coding means for altering these connections to restore at least the transmission of functions in a single direction only opposite to direction of the detected fault.

4. In a remote control system including a control office location and a plurality of stations connected by a communication channel, a control coding means at said office having connections to said channel for transmitting selective control functions to said stations and for receiving indication functions from said stations, indication coding means at each station having connections to said channel for transmitting indication functions to said office and for receiving said selective control functions, a fault monitoring means at each location operably connected to said channel for detecting a continued fault condition which interrupts transmission of functions in only one direction between said office and at least one of said stations, said fault monitoring means at each location controlling the channel connections of the corresponding coding means when a fault is detected for maintaining the transmission of functions in both directions between said office and the stations nearer than the fault location and for restoring the transmission of functions in a single direction only opposite to the faulted direction between said office and the stations more distant than the fault location.

5. In a remote control system including a control office and a plurality of stations connected by a communication channel, said office including a coding unit having connections to said channel for transmitting control functions to said stations and receiving indication functions from said stations, the combination at said office comprising, a first repeater relay and an energizing circuit therefor including a normally open contact closed when a control function transmission is initiated and another contact closed when said unit is inactive, a pulse control circuit means including a front contact of said first repeater relay and operably connected to said unit when completed for initiating the transmission of a station lockout pulse over said channel, said pulse circuit means when closed also initiating an initial timed response by said unit to interrupt said pulse circuit means after a predetermined time interval; a second repeater relay and an energizing circuit therefor including a front contact of said first repeater relay, a contact closed in response to the completion of said pulse circuit means, and a contact controlled by said unit to close during said control timed response; said pulse circuit means being effective when interrupted to initiate the transmission of a reset pulse over said channel and a second timed response by said unit to restore its inactive condition, a code starting circuit means including a front contact of said second repeater relay, another contact controlled by said pulse circuit means to close at the completion of said predetermined time interval, and a timing contact controlled by said unit to close at the end of said second timed response, said code starting circuit means having connections to said unit and effective when completed to initiate the transmission of said control functions only after said second timed response of said unit.

6. In a coded remote control system including a control office and at least one station connected by a communication channel, each location being provided with a coding means connected to said channel for transmitting and receiving information, at said office the combination comprising, a first and a second repeater relay, a synchronizing relay, an energizing circuit for said first relay including a contact closed when a code is stored for transmission and contacts controlled by the office coding means and closed in sines only when said office means is inactive; an energizing circuit for said second relay including a front contact of said first relay, a front contact of said synchronizing relay, and a timing chain contact of said office coding means closed when said unit is active; a stick circuit arrangement for said first and second relays completed when a code is stored for transmission and also when said office coding means is transmitting control information, an energizing circuit for said synchronizing relay including a front contact of said first relay and a back contact of said second relay, a stick circuit for said synchronizing relay including another timing contact of said office coding means closed only when said means is active, a synchronizing pulse circuit means having connections to said office coding means and including a front contact of said synchronizing relay for effecting the transmission of a station lockout pulse over said channel, and a code starting circuit means including a back contact of said synchronizing relay, a front contact of said second relay and other contacts of said coding means closed in series only when said unit is inactive and operably connected to said office coding means for initiating the transmission of control information.

7. In a remote control system comprising a control office, at least one intermediate station, and a final station all connected by a communication channel, a control means at said office operably connected to said channel for transmitting control functions to a selected station which is adapted to receive such controls, an indication transmitting means at each station operably connected to said channel for transmitting indication functions from the associated station to said office which is adapted to receive such indications, control function receiving means at said intermediate station having connections to said channel in each direction for receiving and retransmitting said control functions from said office, an indication receiving means at said intermediate station having connections to said channel in each direction for receiving and retransmitting said indication functions from said final station, the connections of said indication receiving means normally establishing a priority over the connections of said control receiving means so that said indication receiving means is prepared for operation when the system is inactive, a synchronizing means at said office operably connected to said control means for transmitting a single synchronizing cycle over said channel prior to the transmission of any series of control functions to condition said stations to receive that transmission and for delaying the transmission of that series of control functions until said single synchronizing cycle is completed, and a single transmission direction reversing relay at said single intermediate station controlled by said control receiving means and connected to said indication receiving means for conditioning both receiving means to establish retransmission priority for said control receiving means when a synchronizing cycle is received from said office.

8. In a remote control system including a control office and a plurality of stations connected by a communication channel, said office and each station being provided with coding apparatus to transmit and receive coded information over said channel, at an intermediate station the combination comprising, a first and a second receiving relay, said first receiving relay having connections to said channel including a first nonoperated position contact of said second receiving relay for receiving control codes from said office, said second receiving relay having connections to said channel including a nonoperated position contact of said first receiving relay for receiving indication codes from stations more distant from said office, said first contact of said second receiving relay normally being effective to retransmit indication codes from more distant stations to said office, a transmission direction reversing relay and an energizing circuit therefor including an operated position contact of said first receiving relay and another nonoperated position contact of said second receiving relay, a stick circuit arrangement for said reversing relay including a contact controlled by the intermediate station coding apparatus to be closed when any code is received, an energized position contact of said reversing relay being connected in multiple with said second receiving relay first contact to render that contact noneffective when a code is received from said office, and a deenergized position contact of said reversing relay connected in multiple with said first receiving relay contact to render that contact effective to retransmit a control code to more distant stations only when a code is received from said office.

9. In a remote control system including a control office and a plurality of stations connected by a communication channel, said office including a coding unit having connections to said channel for transmitting control functions to said stations and receiving indication functions from said stations, the combination at said office comprising, a first repeater relay and an energizing circuit therefor including a normally open contact closed when a control function transmission is initiated and another contact closed when said unit is inactive, a pulse control circuit means controlled by a front contact of said first repeater relay and connected to said unit for initiating when activated by the closing of said first repeater relay front contact an initial timed response by said unit, said unit having connections to said channel for transmitting a station lockout pulse during said initial timed response to interrupt transmission of indication functions; a second repeater relay and an energizing circuit therefor including another front contact of said first repeater relay, a contact closed when said pulse circuit means is active, and a contact closed by said unit during the initial timed response; said unit and said second repeater relay having connections to said pulse circuit means for jointly deactivating said pulse circuit means at the end of said initial timed response, said pulse circuit means further being effective when deactivated for initiating a second timed response by said unit to restore its inactive condition and the transmission of a synchronizing reset pulse over said channel to said stations; a code starting circuit including a front contact of said second repeater relay, a contact controlled by said pulse circuit means to close when that circuit means is deactivated, and a timing contact controlled by said unit to close at the end of said second timed response; said starting circuit being connected to said unit and effective when complete to initiate the transmission of control functions to said stations.

10. In a remote control system including a control office and a plurality of stations connected by a communication channel, said office including a coding unit having connections to said channel for transmitting control functions to said stations and receiving indication functions from said stations, the combination at said office comprising, a first repeater relay and an energizing circuit therefor including a normally open contact closed when a control function transmission is initiated and another contact closed when said unit is inactive, a synchronizing relay and an energizing circuit therefor including a front contact of said first repeater relay and a contact held closed by said coding unit prior to the initiation of function transmission, a pulse transmission means controlled by a front contact of said synchronizing relay and having connections for effecting the transmission of a station lockout pulse over said channel and an initial timed response by the office coding unit when said synchronizing relay is energized; a second repeater relay and an energizing circuit therefor including another front contact of said first repeater relay, another front contact of said synchronizing relay, and a contact closed by said unit during the initial timed response; a back contact of said second repeater relay being interposed in the synchronizing relay energizing circuit, a stick circuit for said synchronizing relay including a contact held closed by said coding unit until the end of said timed response to deenergize said synchronizing relay, said pulse transmission means being effective by said connections when said synchronizing relay is deenergized for initiating the transmission of a synchronizing reset pulse over said channel and a second timed response by said office coding unit; a code starting circuit including a front contact of said second repeater relay, a back contact of said synchronizing relay, and a pair of timing contacts closed in series by said coding unit only at the end of said second timed response and having connections to said unit; said starting circuit being effective when complete to initiate the transmission of control functions to said stations.

References Cited in the file of this patent

UNITED STATES PATENTS

| | | |
|---|---|---|
| 2,038,056 | Pelican | Apr. 21, 1936 |
| 2,280,009 | Rosensteel | Apr. 14, 1942 |
| 2,409,051 | Lewis | Oct. 8, 1946 |
| 2,445,759 | Bowsher et al. | July 27, 1948 |
| 2,514,367 | Bond et al. | July 11, 1950 |
| 2,543,869 | Rees | Mar. 6, 1951 |
| 2,584,739 | Rees et al. | Feb. 5, 1952 |
| 2,715,218 | Curry | Aug. 9, 1955 |
| 2,731,635 | Walker | Jan. 17, 1956 |
| 2,944,247 | Breese | July 5, 1960 |